United States Patent Office 3,118,893
Patented Jan. 21, 1964

3,118,893
ISOMERIZATION OF 3-EPI-YOHIMBANES
Robert Armistead Lucas, Mendham, Harold Belding MacPhillamy, Madison, and Michael Mullen Robison, Berkeley Heights, N.J., assignors to Ciba Corporation, a corporation of Delaware
No Drawing. Filed Oct. 24, 1961, Ser. No. 147,164
7 Claims. (Cl. 260—287)

The present invention relates to the conversion of a compound having the 1,3β,5,6,14,15,16,17,18,19,20,21-dodecahydrobenz[g]indolo[2,3-a]quinolizine ring system of the formula

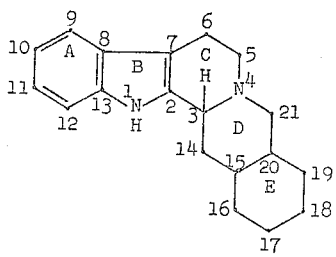

in which the hydrogen attached to the 3-position has the β-configuration, into a compound having the ring system of the formula

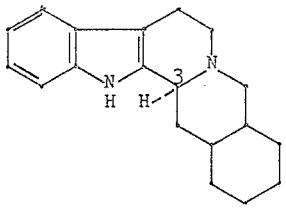

i.e. the 1,3α,5,6,14,15,16,17,18,19,20,21 - dodecahydrobenz[g]indolo[2,3-a]quinolizine ring system, in which the hydrogen attached to the 3-position has the α-configuration.

The 1,3α,5,6,14,15,16,17,18,19,20,21-dodecahydrobenz[g]indolo[2,3-a]quinolizine ring system of the formula

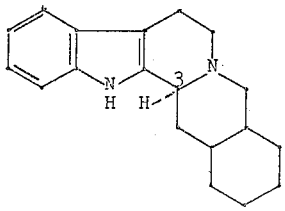

is common to a number of compounds, which can be used as intermediates and/or may have pharmacological activities of their own.

For example, 18-hydroxy-1,3α5,6,14,15α,16α,17,18,19,20α,21-dodecahydro-benz[g]indolo[2,3-a]quinolizine 16β-carboxylic acid compounds, i.e. 18-hydroxy-20α-yohimbane 16β-carboxylic acid compounds, having the ring system of the formula

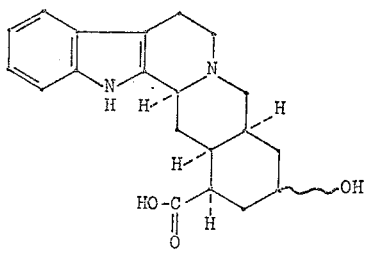

or monoesters, diesters, monoethers or monoester-monoethers thereof, may be used as intermediates for the preparation of 18-hydroxy-1,5,6,15α,16α,17,18,19,20α,21-decahydro-benz[g]indolo[2,3-a]quinolizine 16β - carboxylic acid compounds, i.e. Δ³-18-hydroxy-20α-yohimbene 16β-carboxylic acid compounds, having the ring system of the formula

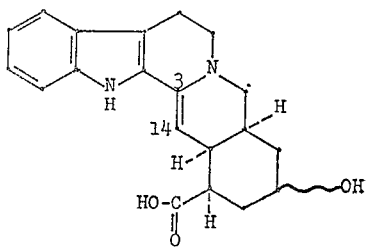

monoesters, diesters, monoethers or monoester-monoethers thereof or the salts of such compounds, in which the double bond extends from the 3-position to the 4-position and which have the ring system of the formula

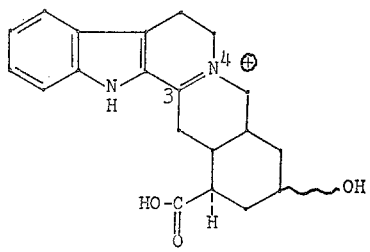

this ring system also prevails, whenever the free 3(14)-dehydro compound is dissolved in a polar solvent. The introduction of a double bond extending from the 3-position into a 20α-yohimbane compound is carried out according to known methods, such as, for example, those described by Weisenborn et al., J. Am. Chem. Soc., vol. 78, p. 2022 (1956), Gottfredsen et al., Acta Chim. Scand., vol. 10, p. 1414 (1956), or Joly et al., U.S. Patent No. 2,957,000. We have found that the introduction of the double bond extending from the 3-position in a Δ³-20α-yohimbene compound occurs most readily by treating a 20α-yohimbane compound, for example, an 18-hydroxy-20α-yohimbane 16β-carboxylic acid or a monoester, monoether, diester or monoester-monoether thereof, with an oxidizing agent containing hexavalent chromium, particularly an alkali metal dichromate, e.g. potassium dichromate and the like, in the presence of an acid reagent, for example, aqueous acetic acid. Although the introduction of the double bond according to this preferred procedure also occurs whenever a 3-epi-20α-yohimbane compound, in which the hydrogen of the 3-position has the β-configuration, is used as the starting material, we have found that it can be more readily carried out in excellent yields by using a 20α-yohimbane compound, in which the hydrogen of the 3-position has the α-configuration, as the starting material. The Δ³-20α-yohimbene compounds are either important as intermediates for the preparation of other compounds or exert pharmacological effects of their own; for example, lower alkoxy-lower alkyl 3-dehydro-18-epi-reserpate chloride and the like, show excellent antifibrillatory effects and can be used accordingly. Δ³-20α-yohimbene compounds, particularly those in which the double bond extends from the 3-position to the 4-position, are useful as intermediates primarily because the reactive tertiary nitrogen atom, representing the 4-position in a 20α-yohimbane or a 3-epi-20α-yohimbane compound, is temporarily protected in the Δ³-20α-yohimbene compounds by the double bond; reactions, such as treatment with aliphatic halides, aliphatic sulfates and the like, can be carried out with a Δ³⁽⁴⁾-20α-yohimbene compound, which would otherwise lead to quaternization of the tertiary nitrogen atom in a 20α-yohimbane or a 3-epi-20α-yohimbane compound. It is also known that the 20α-yohimbane ring system, in which the hydrogen atom of the 3-position has the α-configuration, is more stable than the 3-epi-20α-yohimbane ring system, in which the 3-hydrogen has the β-configuration (MacPhillamy et al., J. Am. Chem. Soc., vol. 77, p. 4338 (1955)); it may, therefore, be advantageous to carry out certain reactions, which may have an effect on the configuration of the hydrogen atom at the 3-position and thus lead to mixtures of isomeric compounds, with compounds having the more stable 20α-yohimbane configuration and then convert them into the desired configuration according to known methods.

As previously mentioned, certain compounds having the 20α-yohimbane ring system, for example, compounds of the 18-hydroxy-20α-yohimbane 16β-carboxylic acid series, particularly diesters or monoester-monoethers thereof, may also have pharmacologically useful effects. For example, 18α-lower alkoxy-lower alkoxy-20α-yohimbane 16β-carboxylic acid lower alkoxy-lower alkyl esters, in which lower alkoxy is separated from the oxygen atom attached to the 18-position by at least two carbon atoms, and lower alkyl separates lower alkoxy from the 16β-carboxyl group by at least two carbon atoms, such as the lower alkoxy-lower alkyl 18-epi-O-(lower alkoxy-lower alkyl)-3-iso-reserpates, in which lower alkyl separates lower alkoxy from the oxygen atom attached to the 18-position by at least two carbon atoms, and lower alkyl separates lower alkoxy from the 16β-carboxyl group by at least two carbon atoms, e.g. 2-methoxyethyl 18-epi-O-(2-methoxyethyl)-3-iso-reserpate and the like, or salts thereof, have unusual stimulating properties and can, therefore, be used as stimulating agents.

Conversion procedures of compounds having the 3-epi-20α-yohimbane ring system, in which the hydrogen attached to the 3-position has the β-configuration and which are available through substances, such as reserpine, deserpidine and the like, derived from natural sources, such as plants of the genus Rauwolfia, into compounds of the 20α-yohimbane series, in which the hydrogen attached to the 3-position has the α-configuration, have been described (note, for example, MacPhillamy et al., loc. cit.). However, none of the known methods is entirely satisfactory with respect to uniformity of the desired product.

We have now found that a compound having the 1,3α,5,6,14,15,16,17,18,19,20,21 - dodecahydro-benz[g]quinolizine or 20α-yohimbane ring system, in which the hydrogen attached to the 3-position has the α-configuration, or a salt, an N-oxide or a salt of an N-oxide thereof, can be obtained in pure form by treating a compound having the 1,3β,5,6,14,15,16,17,18,19,20,21-dodecahydro-benz[g]indolo[2,3-a]quinolizine or 3-epi-20α-yohimbane ring system, in which the hydrogen attached to the 3-position has the β-configuration, or a salt, an N-oxide or a salt of an N-oxide thereof, with hydrogen in the presence of a catalyst containing a metal of the eighth group of the periodic system and of an organic base having a secondary nitrogen atom or an organic base having a tertiary nitrogen atom, and, if desired, converting a resulting compound into a salt, an N-oxide or a salt of an N-oxide thereof, and/or, if desired, separating a mixture of isomers into the single isomers.

A salt of the starting material or of an N-oxide thereof, is more especially an acid addition salt, particularly an acid addition salt with a mineral acid, e.g. hydrochloric, hydrobromic, sulfuric, phosphoric acid and the like.

Preferably, the hydrogen is used under atmospheric pressure, but may also be applied under increased pressure.

The metal of the eighth group of the periodic system of the catalyst is, for example, nickel, platinum, rhodium and the like, but particularly, palladium. Suitable catalysts are palladium on charcoal, as well as Raney nickel, platinum oxide, rhodium on aluminum oxide and the like.

An organic base having a secondary nitrogen atom is, for example, an N,N-disubstituted amine, such as an N,N-di-lower alkyl-amine, e.g. N,N-dimethylamine, N-ethyl-N-methyl-amine, N,N-diethylamine and the like, N-lower alkyl-aniline, e.g. N-methyl-aniline and the like, N-lower alkyl-N-phenyl-lower alkyl-amine, e.g. N-benzyl-N-methyl-amine and the like, or an N,N-alkylene-imine, in which alkylene has from four to six carbon atoms, e.g. pyrrolidine, piperidine and the like, N,N-oxa-alkylene-imine, in which alkylene has preferably four carbon atoms, e.g. morpholine and the like, or N,N-aza-alkylene-imine, in which alkylene has preferably four carbon atoms, e.g. piperazine and the like.

The preferred organic base is an organic amine having a tertiary nitrogen atom; such amine is particularly an N,N,N-trisubstituted amine, such as an N,N,N-tri-lower alkyl-amine, e.g. N,N,N-trimethylamine, N,N-dimethyl-N-ethyl-amine, N,N,N-triethyl-amine and the like, as well as an N,N,N',N'-tetra-lower alkyl-alkylenediamine, e.g. N,N,N',N'-tetramethyl-1,6-hexylenediamine, N,N,N',N'-tetraethyl-1,6-hexylenediamine, N,N,N',N'-tetramethyl-1,7-heptylenediamine and the like, or an N-lower alkyl-N,N-alkylene-imine, in which alkylene has from five to seven carbon atoms, e.g. N-methyl-pyrrolidine, N-methyl-piperidine, N-ethyl-piperidine and the like, an N-lower alkyl-N,N-oxa-alkylene-imine, in which alkylene has preferably four carbon atoms, e.g. 4-methyl-morpholine, or an N,N'-di-lower alkyl-N,N - aza - alkylene-imine, in which alkylene has preferably four carbon atoms, e.g. 1,4-dimethyl-piperazine and the like. Other suitable organic bases having tertiary nitrogen atoms are heterocyclic aryl compounds having a basic ring nitrogen atom, e.g. pyridine, collidine and the like, or any other analogous organic amine.

Generally, the reaction of this invention proceeds at room temperature but, if necessary, the reaction mixture may be heated. It is preferably carried out in the presence of an inert solvent, such as, for example, a lower alkanol, e.g. methanol, ethanol, isopropanol, n-butanol and the like, an ether, e.g. p-dioxane, tetrahydrofuran and the like, a halogenated hydrocarbon, e.g. methylene chloride, tetrachloroethane and the like, or any other suitable solvent.

Starting materials used in the procedure of this invention are particularly the compounds of the 18-hydroxy-1,3β,5,6,14,15α,16α,17,18,19,20α,21 - dodecahydro-benz[g]indolo[2,3-quinolizine 16β-carboxylic acid or 18-hydroxy-3-epi-20α-yohimbane 16β-carboxylic acid series, having the formula

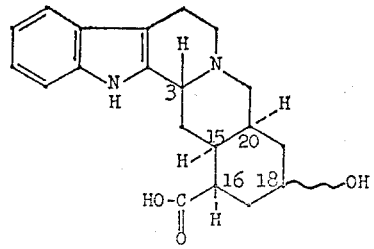

especially those of the 18-hydroxy-17α-R-3-epi-20α-yohimbane 16β-carboxylic acid series, in which R stands primarily for lower alkoxy, as well as hydrogen or cyano. The starting materials used in the above reaction are, therefore, 18-hydroxy-3-epi-20α-yohimbane 16β-carboxylic acids, the monoesters, monoethers, diesters and monoester-monoethers of such compounds, or salts thereof. These compounds may be illustrated by 18β-hydroxy-17α-lower alkoxy-3-epi-20α-yohimbane 16β-carboxylic acids, 18α-hydroxy-17α-lower alkoxy-3-epi-20α-yohimbane 16β-carboxylic acids, 18β-hydroxy-17α-lower alkoxy-3-epi-20α-yohimbane 16β-carboxylic acid esters, 18α-hydroxy-17α-lower alkoxy-3-epi-20α-yohimbane 16β-carboxylic acid esters,
18β-etherified hydroxy-17α-lower alkoxy-3-epi-20α-yohimbane 16β-carboxylic acids,
18α-etherified hydroxy-17α-lower alkoxy-3-epi-20α-yohimbane 16β-carboxylic acids,
18β-organic carbonyloxy-17α-lower alkoxy-3-epi-20α-yohimbane 16β-carboxylic acid esters,
18α-organic carbonyloxy-17α-lower alkoxy-3-epi-20α-yohimbane 16β-carboxylic acid esters,
18β-organic sulfonyloxy-17α-lower alkoxy-3-epi-20α-yohimbane 16β-carboxylic acid esters,
18α-organic sulfonyloxy-17α-lower alkoxy-3-epi-20α-yohimbane 16β-carboxylic acid esters,
18β-etherified hydroxy-17α-lower alkoxy-3-epi-30α-yohimbane 16β-carboxylic acid esters
or 18α-etherified hydroxy-17α-lower alkoxy-3-epi-20α-yohimbane 16β-carboxylic acid esters,
or acid addition salts of such compounds.

In these compounds, the 16β-carboxylic acid esters are primarily lower alkyl esters, e.g. methyl, ethyl, n-propyl, isopropyl, n-butyl and the like, or lower alkoxy-lower alkyl esters, in which lower alkoxy is separated from the 16β-carboxyl group by at least two, preferably by from two to three, carbon atoms, such as 2-lower alkoxy-ethyl esters, e.g. 2-methoxyethyl, 2-ethoxyethyl and the like, as well as 2-lower alkoxy-2-methyl-ethyl esters, 3-lower alkoxy-propyl esters and the like, as well as phenyl lower alkyl esters, e.g. benzyl and the like, or tertiary amino-lower alkyl esters, in which lower alkyl separates tertiary amino, representing, for example, N,N-di-lower alkyl-amino, N,N-alkylene-imino and the like, from the 16β-carboxyl group by at least two, preferably by from two to three, carbon atoms, such as 2-N,N-di-lower alkyl-amino-ethyl, e.g. 2-N,N-dimethylaminoethyl and the like, esters, or any other analogous ester.

Ethers of the 18-hydroxyl group are especially lower alkyl ethers, e.g. methyl, ethyl, n-propyl, isopropyl, n-butyl, n-pentyl, n-hexyl and the like, or lower alkoxy-lower alkyl ethers, in which lower alkyl separates lower alkoxy from the oxygen attached to the 18-position by at least two, preferably from two to three, carbon atoms, such as 2-lower alkoxy-ethyl ethers, e.g. 2-methoxyethyl, 2-ethoxyethyl and the like, as well as 2-lower alkoxy-2-methyl-ethyl ethers, 3-lower alkoxy-propyl ethers and the like, as well as cycloalkyl-lower alkyl ethers, in which cycloalkyl has from three to eight, preferably from five to seven, carbon atoms, e.g. cyclopropylmethyl, cyclopentylmethyl, 2-cyclohexylethyl, cycloheptylmethyl and the like, phenyl-lower alkyl ethers, e.g. benzyl and the like, tertiary amino-lower alkyl ethers, in which lower alkyl separates tertiary amino, representing, for example, N,N-di-lower alkyl-amino, N,N-alkylene-imino and the like, from the 18-oxygen atom by at least two, preferably by from two to three, carbon atoms, such as 2-N,N-di-lower alkyl-amino-ethyl ethers, e.g. N,N-dimethylaminoethyl and the like, or any analogous ether.

The organic carbonyl portion of an 18-organic carbonyloxy group is represented by the acyl radical of an organic carboxylic acid, such as a lower alkanoic acid, e.g. acetic, propionic, pivalic acid and the like, or, more particularly, a monocyclic carbocyclic aryl carboxylic acid, such as benzoic acid, lower alkyl-benzoic acid, e.g. 3,4,5-trimethyl-benzoic acid and the like, a hydroxy-benzoic acid, e.g. 4-hydroxy-benzoic acid and the like, a lower alkoxy-benzoic acid, e.g. 3,4-dimethoxy-benzoic, 3,4,5-trimethoxy-benzoic acid and the like, a lower alkyl-(lower alkoxy)-benzoic acid, e.g. 3,5-dimethyl-4-methoxy-benzoic acid and the like, a lower alkoxy-(lower alkoxy-carbonyloxy)-benzoic acid, e.g. O-ethoxycarbonyl-syringic acid and the like, an N,N-di-lower alkyl-amino-benzoic acid, e.g. 3-N,N-dimethylamino-benzoic acid and the like, or a monocyclic carbocyclic aryl-lower alkanoic or a monocyclic carbocyclic aryl-lower alkenoic acid, e.g. 3,4,5-trimethoxy-dihydrocinnamic, 3,4,5-trimethoxycinnamic, O-ethoxycarbonyl-ferulic acid and the like, as well as the acyl radical of a monocyclic heterocyclic aryl carboxylic acid, e.g. nicotinic, isonicotinic, furoic acid and the like, or any other analogous carboxylic acid, used to furnish the acyl radical in an 18-esterified hydroxyl group of known 3-epi-20α-yohimbane compounds. The organic sulfonyl group portion of an 18-organic sulfonyloxy group represents the acyl radical of an aliphatic sulfonic acid, such as a lower alkane sulfonic acid, e.g. methane sulfonic, ethane sulfonic acid and the like, or, more especially, of a monocyclic carbocyclic aryl-sulfonic acid, e.g. benzene sulfonic, 4-bromo-benzene sulfonic, 3-nitro-benzene sulfonic, 4-nitro-benzene sulfonic, p-toluene sulfonic acid and the like.

More specific groups of compounds of the above type are reserpic acid, 18-epi-reserpic acid, lower alkyl reserpates, lower alkyl 18-epi-reserpates, 18-O-lower alkyl reserpic acids, 18-epi-O-lower alkyl-reserpic acids and, particularly, lower alkoxy-lower alkyl 18-epi-O-(lower alkoxy-lower alkyl)-reserpates, in which lower alkyl separates lower alkoxy from the oxygen atom attached to the 18-position by from two to three carbon atoms, and lower alkyl separates lower alkoxy from the 16β-carboxyl group by from two to three carbon atoms, as well as lower alkyl 18-O-lower alkanoyl-reserpates, lower alkyl 18-O-monocyclic carbocyclic aroyl-reserpates, lower alkyl 18-O-monocyclic carbocyclic aryl-lower alkenoyl-reserpates, lower alkyl 18-O-lower alkyl-sulfonyl-reserpates, lower alkyl 18-epi-O-lower alkyl-sulfonyl-reserpates, lower alkyl 18-O-monocyclic carbocyclic aryl - sulfonyl-reserpates, lower alkyl 18-epi-O-monocyclic carbocyclic aryl-sulfonyl-reserpates, lower alkyl 18-O-lower alkyl-reserpates, lower alkyl 18-epi-O-lower alkyl-reserpates or analogous compounds of the reserpic and the 18-epi-reserpic acid series, or acid addition salts thereof. Other starting materials are the deserpidic acid, lower alkyl deserpidates, lower alkyl 18-epi-deserpidates, 18-O-lower alkyl-deserpidic acids, 18-epi-O-lower alkyl-deserpidic acids, lower alkyl 18-O-lower alkanoyl-deserpidates, lower alkyl 18-O-monocyclic carbocyclic aroyl-deserpidates, lower alkyl 18-O-monocyclic carbocyclic aryl-lower alkenoyl-deserpidates, lower alkyl 18-O-lower alkyl-sulfonyl-deserpidates, lower alkyl 18-epi-O-lower alkyl-sulfonyl-deserpidates, lower alkyl 18-O-monocyclic carbocyclic aryl-sulfonyl-deserpidates, lower alkyl 18-epi-O-monocyclic carbocyclic aryl-sulfonyl-deserpidates, lower alkyl 18-O-lower alkyl-deserpidates, lower alkyl 18-epi-O-lower alkyl-deserpidates and the like, or analogous compounds of the deserpidic and 18-epi-deserpidic acid series, particularly those, in which the 9-position, the 10-position, the 11-position and/or the 12-position are substituted by lower alkyl, e.g. methyl, ethyl and the like, lower alkoxy, e.g. methoxy, ethoxy, n-propyloxy, isopropyloxy and the like, lower alkylene-dioxy, e.g. methylenedioxy, 1,1-ethylenedioxy and the like, lower alkyl-mercapto, e.g. methylmercapto, ethylmercapto and the like, halogeno, e.g. fluoro, chloro, bromo and the like, or any other suitable substituent, and/or in which the 5-position and/or the 6-position carries a lower alkyl, particularly methyl, group, and/or in which the 17α-methoxy group is replaced by another lower alkoxy, e.g. ethoxy, n-propyloxy, isopropyloxy, and the like, group or by hydrogen, cyano or any other analogous group, or acid addition salts thereof.

The 18β-hydroxy-3-epi-20α-yohimbane 16β-carboxylic acids, monoesters and diesters thereof, which are used as starting materials in the above oxidation reaction, are known or may be prepared according to known methods. Monoester-monoethers of such acids may be prepared, for example, by reacting corresponding acid esters with diazo-compounds in the presence of fluoboric acid; upon hydrolysis of the resulting monoester-monoethers, monoether-acids may be formed. 18α-hydroxy-3-epi-20α-yohimbane 16β-carboxylic acids, esters and 18-ethers thereof may be manufactured, for example, by hydrolysis or alcoholysis of a suitable 18β-organic sulfonyloxy-3-epi-20α-yohimbane 16β-carboxylic acid ester, preferably in the presence of N,N,N-triethylamine; from a resulting 18α-hydroxy-3-epi-20α-yohimbane 16β-carboxylic acid or 16β-carboxylic acid ester, 18α-ethers and 18α-esters can be formed according to know methods.

The compounds prepared according to the process of this invention may be obtained in the form of mixtures of racemates, single racemates or antipodes. Mixtures of racemates may be separated into the single racemates on the basis of physico-chemical differences, for example, by fractionated crystallization and the like.

Resulting racemates, forming acid addition salts, may be resolved, for example, by treating a solution of the free racemic base in a suitable inert solvent with one of the optically active forms of an acid containing an asymmetric carbon atom, or a solution thereof. Especially useful as optically active forms of salt-forming acids having an asymmetric carbon atom are D- and L-tartaric acid, as well as the optically active forms of di-o-toluyl-tartaric, malic, mandelic, camphor-10-sulfonic, quinic acid and the like. A salt may then be isolated, which is formed by the optically active acid with one of the optically active forms of the base. The optically active forms may also be obtained by resolving racemates using biochemical methods. From an optically active salt, the free and optically active compounds may be obtained according to known methods used for the conversion of a salt into a free compound, for example, as outlined hereinbelow. A resulting optically active base may be converted into an acid addition salt with one of the acids mentioned hereinbefore, or into an N-oxide or an acid addition salt of an N-oxide thereof, as shown hereinbelow.

The compounds prepared according to the procedure of this invention or the N-oxides thereof may be obtained in the form of the free bases or as the salts thereof. A salt, including a salt of an N-oxide, may be converted into the free base, for example, by reacting the former with a basic reagent, such as, for example, aqueous ammonia, silver oxide and the like, or an ion exchange resin. A free base or the N-oxide thereof may be converted into the therapeutically useful acid addition salts thereof by treating it with one of the inorganic or organic acids mentioned hereinbefore; the reaction may be carried out, for example, by treating a solution of the free base in a suitable inert solvent with the acid or a solution thereof and isolating the resulting salt. The salts may also be obtained as the hemi-hydrates, monohydrates, sesquihydrates or polyhydrates depending on the conditions used in the formation of the salts.

N-oxides of the compounds prepared according to the procedure of the present invention may be formed according to known methods; for example, a resulting compound, preferably a solution thereof in an inert solvent, may be reacted with an N-oxidizing reagent, such as, for example, hydrogen peroxide, ozone, persulfuric acid, or more especially, an organic peracid, such as an organic precarboxylic acid, e.g. peracetic, perbenzoic, monoperphthalic acid and the like, or a persulfonic acid, e.g. p-toluene persulfonic acid and the like. Inert solvents used in the preparation of the N-oxides are, for example, halogenated lower alkanes, e.g. methylene chloride, chloroform, ethylene chloride and the like, lower alkanols, e.g. methanol, ethanol and the like, or any other suitable solvent. In the N-oxidation reaction an excess of the oxidation reagent and/or an increase in temperature should be avoided in order to prevent oxidative degradation.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

A mixture of 0.5 g. of methyl 18-epi-O-methyl-reserpate, 0.25 g. of a palladium catalyst (10 percent palladium on charcoal) and 5 ml. of N,N,N-triethylamine in 15 ml. of anhydrous ethanol is stirred at room temperature in an atmosphere of hydrogen for five days. The catalyst is filtered off, the filtrate is evaporated twice from ethanol to yield the pure methyl 18-epi-O-methyl-3-iso-reserpate, M.P. 245–248°.

*Example 2*

A mixture of 0.5 g. of methyl 18-epi-reserpate, 0.25 g. of a palladium catalyst (10 percent palladium on charcoal) and 5 ml. of N,N,N-triethylamine in 15 ml. of anhydrous ethanol is stirred at room temperature in an atmosphere of hydrogen for three days. The reaction mixture is worked up as shown in Example 1 to yield 0.430 g. of pure methyl 18-epi-3-iso-reserpate, M.P. 217–219°.

*Example 3*

A mixture of 0.5 g. of 2-methoxyethyl 18-epi-O-(2-methoxyethyl)-reserpate, 0.25 g. of a palladium catalyst (10 percent palladium on charcoal) and 5 ml. of N,N,N-triethylamine in 15 ml. of anhydrous ethanol is treated with hydrogen as shown in Example 1; the resulting pure 2-methoxyethyl 18-epi-O-(2-methoxyethyl)-3-iso-reserpate melts at 157–160°; $[\alpha]_D^{24} = -17°$ (in chloroform).

The solvent from a solution of 0.44 g. of 2-methoxyethyl 18-epi-O-(2-methoxyethyl)-3-iso-reserpate and 0.95 ml. of 1 N hydrochloric acid in 20 ml. of water is removed by freeze-drying (lyophylization). The residue is dried in a desiccator to yield 0.475 g. of the 2-methoxyethyl 18-epi-O-2-methoxyethyl-3-iso-reserpate hydrochloride dihydrate, M.P. 172–177°.

The starting material used in the above example may be prepared as follows: A mixture of 3.0 g. of 2-methoxyethyl reserpate and 4.2 g. of 4-bromo-benzene sulfonyl chloride in 35 ml. of dry pyridine is cooled in an ice-water bath and is then allowed to stand at room temperature in the dark for two days. The reaction mixture is poured into ice-water and the organic material is extracted with methylene chloride; the organic solution is washed twice with a five percent aqueous sodium carbonate solution, with water and a saturated aqueous sodium chloride solution, dried over sodium sulfate and evaporated to a small volume. Toluene is added, the solvents are stripped off, and the residue is dissolved in methylene chloride. This solution is filtered through charcoal, the solvent is evaporated and the residue is recrystallized from benzene to yield the desired 2-methoxyethyl 18-O-(4 - bromo - phenylsulfonyl) - reserpate, M.P. 185–187°; $[\alpha]_D^{26} = -76°$ (in chloroform); yield: 3.0 g.

A mixture of 3.0 g. of 2-methoxyethyl 18-O-(4-bromophenyl-sulfonyl)-reserpate, 0.45 g. of N,N,N-triethylamine and 200 ml. of 2-methoxyethanol is heated in a sealed bottle on the steam bath for eleven days. The excess 2-methoxyethanol is evaporated under reduced pressure, the residue is dissolved in methylene chloride, and the organic solution is washed twice with five percent aqueous sodium carbonate and once with saturated aqueous sodium chloride. The methylene chloride solution is washed, is dried over sodium sulfate and the solvent is evaporated under reduced pressure and the residue is crystallized on addition of diethyl ether. The solid material is filtered off and redissolved in methylene chloride; the organic solution is passed through a charcoal preparation and evaporated. The desired 2-methoxyethyl 18-epi-O-(2-methoxyethyl)-reserpate is crystallized from diethyl ether and melts at 144–147°; $[\alpha]_D^{24} = -22°$ (in chloroform); yield: 1.4 g.

*Example 4*

A mixture of 0.25 g. of 2-methoxyethyl 18-epi-reserpate, 0.125 g. of a palladium catalyst (10 percent palladium on charcoal) and 2.5 ml. of N,N,N-triethylamine in 7.5 ml. of anhydrous ethanol is treated with hydrogen as shown in Example 1; the desired 2-methoxyethyl 18-epi-3-iso-reserpate melts at 245–248°; $[\alpha]_D^{24} = -39°$ (chloroform).

The starting material used in the above example is prepared as follows: A mixture of 9.6 g. of 2-methoxyethyl reserpate, 6.0 g. of 3-nitro-benzene sulfonic acid chloride and 15 ml. of pyridine is prepared at 0°, and is allowed to stand at 5° overnight and at room temperature for three hours. The reaction mixture is poured into 600 ml. of water containing 4.5 ml. of N,N,N-triethylamine and 10 ml. of aqueous ammonia. The granular solid is filtered off, washed with water and dissolved in methylene chloride. The organic solution is filtered through a column containing a diatomaceous earth preparation, the solvent is evaporated, and the residue is dissolved in a small amount of methylene chloride. The 2-methoxyethyl 18-O-(3-nitro-phenyl-sulfonyl)-reserpate crystallizes upon concentrating the solution until crystallization begins and then adding a 50 percent excess of diethyl ether and is purified by washing with diethyl ether, M.P. 152–156°.

A mixture of 5.0 g. of 2-methoxyethyl 18-O-(3-nitrophenyl-sulfonyl)-reserpate, 1.2 g. of N,N,N-triethylamine and 40 ml. of water in 118 ml. of p-dioxane is refluxed gently under an atmosphere of nitrogen for five days. The solvents are evaporated, the residue is dissolved in 200 ml. of 5 percent aqueous hydrochloric acid, and the acid solution is treated with aqueous ammonia. The resulting precipitate is filtered off, washed with water, dried and crystallized from ethyl acetate. The desired 2-methoxyethyl 18-epi-reserpate is recrystallized from ethyl acetate, M.P. 168–170°; $[\alpha]_D^{24} = -69°$ (chloroform).

*Example 5*

A mixture of 0.25 g. of methyl reserpate, 0.125 g. of a 10 percent palladium on charcoal catalyst, and 2.5 ml. of N,N,N-triethylamine in 7.5 ml. of anhydrous ethanol is treated with hydrogen as shown in Example 1; the desired methyl 3-iso-reserpate melts at 222°; $[\alpha]_D^{26} = -59°$ (in chloroform).

Additional catalysts which, in the above examples, may replace the palladium catalyst are, for example, a nickel catalyst (e.g. Raney nickel), a rhodium catalyst (e.g. rhodium on aluminum), a platinum catalyst (e.g. platinum oxide) and the like, whereas N,N,N-triethylamine may be replaced by another N,N,N-tri-lower alkyl-amine, such as N,N,N-trimethylamine, N-ethyl-N,N-dimethylamine and the like, as well as by another amine, such as N,N-diethylamine, pyrrolidine, piperidine, N-methyl-morpholine and the like.

Starting materials other than those mentioned in the above examples, are particularly other 18α-(lower alkoxy-lower alkoxy)-3-epi-20α-yohimbane 16β-carboxylic acid lower alkoxy-lower alkyl esters, in which lower alkoxy is separated from the oxygen attached to the 18-carbon atoms by at least two carbon atoms, and lower alkyl separates lower alkoxy from the 16β-carboxyl group by at least two carbon atoms, such as another lower alkoxy-lower alkyl 18-epi-O-(lower alkoxy-lower alkyl)-reserpate, in which lower alkyl separates lower alkoxy from the 18-oxygen atom by from two to three carbon atoms, and lower alkyl separates lower alkoxy from the 16β-carboxyl group by from two to three carbon atoms, such as 2-ethoxyethyl 18-epi-O-(2-methoxyethyl)-reserpate, 2-methoxyethyl 18-epi-O-(2-ethoxyethyl)-reserpate, 2-ethoxyethyl 18-epi-O-(2-ethoxyethyl)reserpate and the like, as well as reserpic acid, ethyl reserpate, n-propyl reserpate, ethyl 18-epi-reserpate, n-propyl 18-epi-reserpate, 18-O-methyl-reserpic acid, 18-O-ethyl-reserpic acid, 18-O-n-propyl-reserpic acid, 18-epi-O-methyl-reserpic acid, 18-epi-O-ethyl-reserpic acid, 18-epi-O-n-propyl-reserpic acid, methyl 18-O-actyl-reserpate, reserpine, syrosingopine, recinnamine, methyl 18-O-methyl-sulfonyl-reserpate, methyl 18-epi-O-methyl-sulfonyl-reserpate, methyl 18-O-(4-bromo-phenyl-sulfonyl)reserpate, methyl 18-O-(3-nitro-phenyl-sulfonyl)-reserpate, n-propyl 18-O-(3-nitro-phenyl-sulfonyl)reserpate, ethyl 18-O-(4-nitro-phenyl-sulfonyl)reserpate, methyl 18-epi-O-(4-bromo-phenyl-sulfonyl)reserpate, methyl 18-epi-O-(3-nitro-phenylsulfonyl)-reserpate, n-propyl 18-epi-O-(3-nitro-phenyl-sulfonyl)-reserpate, ethyl 18-epi-O-(4-nitro-phenyl-sulfonyl)-reserpate, methyl 18-O-methyl-reserpate, methyl 18-O-ethyl-reserpate, methyl 18-epi-O-ethyl-reserpate, methyl 18-epi-O-n-propyl-reserpate, or similar monoesters, monoethers, diesters or monoester-monoethers of the reserpic or 18-epi-reserpic acid type, or analogous monoesters, monoethers, diesters, or monoester-monoethers of the deserpidic or 18-epi-deserpidic acid series or analogous deserpidic or 18-epi-deserpidic acids containing substitutents attached to the 5-, 6-, 9-, 10-, 11- and/or 12-positions, as shown hereinbefore and/or having the 17α-methoxy group replaced by another lower alkoxy group, or by hydrogen, cyano and the like, or acid addition salts thereof.

What is claimed is:

1. In the process for the preparation of a compound having the 1,3α,5,6,14,15,16,17,18,19,20,21-dodecahydrobenz[g]indolo[2,3-a]quinolizine ring system, the step which comprises treating a member selected from the group consisting of a compound having the 1,3β,5,6,14,15, 16,17,18,19,20,21 - dodecahydro - benz[g]indolo[2,3-a]-quinolizine ring system, a salt, an N-oxide or a salt of an N-oxide thereof, with hydrogen in the presence of a hydrogenation catalyst containing a metal selected from the group consisting of nickel, platinum, rhodium and palladium, and in the presence of a base selected from the group consisting of N,N-di-lower alkyl-amine, N-lower alkyl-aniline, N-lower alkyl-N-phenyl-lower alkyl-amine, N,N-alkylene-imine, in which alkylene has from four to six carbon atoms, morpholine, piperazine, N,N,N-tri-lower alkyl-amine, N,N,N',N'-tetra-lower alkyl-alkylene-diamine, N-lower alkyl-N,N-alkylene-imine, in which alkylene has from four to six carbon atoms, N-lower alkyl-morpholine, N,N'-di-lower alkyl-piperazine, pyridine and collidine.

2. Process according to claim 1, which comprises using hydrogen under atmospheric pressure.

3. Process according to claim 1, which comprises using N,N,N-triethylamine as the N,N,N-tri-lower alkyl-amine.

4. Process according to claim 1, which comprises carrying out the reaction at room temperature.

5. Process according to claim 1, which comprises using a member selected from the group consisting of an 18-hydroxy-3-epi-20α-yohimbane 16β-carboxylic acid, a monoester, a monoether, a diester and a monoester-monoether thereof as the starting material having the 1,3β,5,6, 14,15,16,17,18,19,20,21 - dodecahydro - benz[g]indolo-[2,3-a]quinolizine ring system.

6. Process according to claim 1, which comprises using a lower alkoxy-lower alkyl 18-epi-O-(lower alkoxy-lower alkyl)-reserpate, in which lower alkyl separates lower alkoxy from the oxygen atom attached to the 18-position by at least two carbon atoms, and lower alkyl separates lower alkoxy from the 16β-carboxyl group by at least two carbon atoms as the starting material having the 1,3β,5, 6,14,15,16,17,18,19,20,21 - dodecahydro - benz[g]indolo-[2,3-a]quinolizine ring system.

7. Process according to claim 6, which comprises using 2-methoxyethyl 18-epi-O-(2-methoxyethyl)-reserpate as the lower alkoxy-lower alkyl 18-epi-O-(lower alkoxy-lower alkyl)-reserpate.

References Cited in the file of this patent

UNITED STATES PATENTS

| | | |
|---|---|---|
| 2,877,225 | Taylor | Mar. 10, 1959 |
| 2,977,365 | Weisenborn et al. | Mar. 28, 1961 |

OTHER REFERENCES

Weisenborn: Jour. Amer. Chem. Soc., vol. 79 (1957), pp. 4818, 4819.